(12) United States Patent
La et al.

(10) Patent No.: US 12,583,630 B2
(45) Date of Patent: Mar. 24, 2026

(54) ROBOTIC SYSTEM FOR CIVIL INFRASTRUCTURE INSPECTION

(71) Applicant: Board of Regents of the Nevada System of Higher Education, on behalf of the University of Nevada, Reno, Reno, NV (US)

(72) Inventors: Hung M. La, Reno, NV (US); Son Thanh Nguyen, Reno, NV (US)

(73) Assignee: Board of Regents of the Nevada System of Higher Education on behalf of the University of Nevada Reno, Reno, NV (US)

( * ) Notice: Subject to any disclaimer, the term of this patent is extended or adjusted under 35 U.S.C. 154(b) by 30 days.

(21) Appl. No.: 18/653,205

(22) Filed: May 2, 2024

(65) Prior Publication Data

US 2024/0367824 A1 Nov. 7, 2024

Related U.S. Application Data

(60) Provisional application No. 63/463,842, filed on May 3, 2023.

(51) Int. Cl.
| | |
|---|---|
| *B64U 10/16* | (2023.01) |
| *B64U 50/13* | (2023.01) |
| *B64U 50/30* | (2023.01) |
| *B64U 101/26* | (2023.01) |

(52) U.S. Cl.
CPC ............ *B64U 10/16* (2023.01); *B64U 50/13* (2023.01); *B64U 50/30* (2023.01); *B64U 2101/26* (2023.01); *B64U 2201/10* (2023.01)

(58) Field of Classification Search
CPC .... B64U 10/16; B64U 50/13; B64C 2025/008
See application file for complete search history.

(56) References Cited

U.S. PATENT DOCUMENTS

| | | | | |
|---|---|---|---|---|
| 10,875,644 B2 * | 12/2020 | Bosworth | ............... | B64F 1/007 |
| 2010/0044499 A1 * | 2/2010 | Dragan | .................. | B64U 50/19 |
| | | | | 244/17.23 |
| 2016/0196756 A1 * | 7/2016 | Prakash | ................. | B64U 80/25 |
| | | | | 701/3 |
| 2019/0127052 A1 * | 5/2019 | Chen | ........................ | B64C 25/12 |
| 2020/0283144 A1 * | 9/2020 | Andeweg | ................. | G05D 1/49 |

* cited by examiner

*Primary Examiner* — Justin M Benedik

(57) ABSTRACT

A modular, hybrid robotic system for inspecting a structure can include a rigid frame, a modular propulsion system associated with a flight mode of the robotic system, the propulsion system comprising a plurality of propellers, a modular locomotion system associated with a climbing and/or driving mode of the robotic system, the locomotion system comprising a plurality of wheel systems, each wheel system comprising a support leg coupled to the rigid frame and at least one wheel coupled to the support leg, and a modular floating system associated with a swimming mode of the robotic system. In operation, all or some of the components of the propulsion system, locomotion system, and floating system can be included depending on a desired function.

19 Claims, 12 Drawing Sheets

ROBOTIC SYSTEM FOR CIVIL INFRASTRUCTURE INSPECTION

CROSS REFERENCE TO RELATED APPLICATION

This application claims priority to U.S. Provisional Application No. 63/463,842, filed May 3, 2023. The prior application is incorporated herein by reference in its entirety.

ACKNOWLEDGMENT OF GOVERNMENT SUPPORT

This invention was made with government support under contracts 1919127, 1846513, IIP-1559942, NSF-IIP #1559942, IIP 1535716, and NSF-IIP #1639092 awarded by the National Science Foundation, as well as contracts GR11087 and 69A3551747126 awarded by the Department of Transportation. The government has certain rights in the invention.

FIELD

This disclosure generally relates to robotic systems that can obtain information regarding various structures, such as civil infrastructure and other equipment inspections.

BACKGROUND

The National Academy of Engineering has identified restoring and improving civil urban infrastructure as a critical grand societal challenge for the 21st century because infrastructure in America is deteriorating. For example, approximately 67,000 of the nation's highway bridges have been categorized as structurally deficient and 85,000 as functionally obsolete, and this deterioration is exacerbated by increasing mechanical loads and increasing environmental exposures from more severe hurricanes, earthquakes, floods, and heatwaves. Deteriorating infrastructure not only threatens safety, but it also reduces economic competitiveness. Roughly half of U.S. bridges were built more than 50 years ago and were thought to have a 50-year life when built, so ensuring the integrity of existing bridges is a pressing matter.

Enhancing the resilience of valuable infrastructure is costly. In the U.S., more than USD$12 billion is budgeted annually for infrastructure maintenance. To sustain normal use of infrastructure in face of any incidental defects or weather volatility, the condition of the infrastructure must be effectively inspected and monitored. Current inspection processes mainly rely upon manual human inspection, which tends to provide neither accurate nor rapid information about the condition of the infrastructure. Manual inspection tends to be expensive, sometimes dangerous and leads to shutdowns or other costs (e.g., congestion from blocked traffic during a bridge inspection).

Improvements in devices and methods for inspecting structures and/or other physical or environmental conditions are desirable.

SUMMARY

A robotic system for inspecting a structure can include a rigid frame with a first side, a second side, a third side, and a fourth side. One or more of a propulsion system, locomotion system, and/or floatation system (e.g., a buoyant member) can be coupled to the frame, either in a modular or permanent coupling. This can include a plurality of propellers and the locomotion system can include a plurality of wheel systems, with each wheel system comprising a support leg coupled to the rigid frame and at least one wheel coupled to the support leg. Actuators can be provided to cause the support legs to move relative to the rigid frame and/or to cause one or more wheels to rotate. The flotation system can include at least one buoyant member coupled to the rigid frame, with the buoyant member being sufficiently buoyant to cause the robotic system to float when the buoyant member is in contact with water.

In some examples, the propulsion system comprises a plurality of support arms that extend from the rigid frame, and the plurality of propellers comprise at least two propellers attached to each support arm.

In some examples, the rigid frame comprises an upper side and a lower side, and the propulsion system comprises four downward facing propellers coupled to the upper side of the rigid frame and four upward facing propellers coupled to the lower side of the rigid frame. The propulsion system can also include four pairs of facing propellers, with each pair of facing propellers aligned with each other along a vertical axis. Each support arm can have a first end and a second end, and each first end and second end of a respective support arm can have a propeller coupled thereto. In addition, a respective one of the support legs can be coupled to the each of the support arms at the first end and the second end. The propellers can be 4-blade propellers.

Each support arm can have a first side and a second side that is opposite the first side, with the propellers being coupled to the support arms on the first side and the support legs are coupled to the support arms on the second side. One or more batteries can be coupled to the frame.

A plurality of sensors can be provided to receive information about the structure and/or the robotic system. The plurality of sensors can include one or more navigation sensors, such as IMU, GPS, or UWB sensors. The plurality of sensors can also include one or more of a video camera, thermal camera, RGB-D camera, LiDAR, laser scanner, RADAR, ultrasonic sensor, or an infrared sensor. The plurality of sensors can also include a wind sensor that can detect information about wind magnitude and direction.

In some examples, an extendable member can be provided that can have one or more moving components to extend from the rigid frame from a first length to a second length, with the second length being greater than the first. The extendable member can be, for example, a delta manipulator or zippermast mechanism. At least one of the plurality of sensors can be mounted on the extendable member.

In some examples, the robotic system includes at least one cyclorotor mounted on the frame, the at least one cyclorotor comprising a plurality of blades, such as a pair of spaced-apart cyclorotors.

In some examples, a wind controller can be configured to receive wind data from the wind sensor, transmit the wind data to a controller, and adjust a rotational speed and/or a pitch angle of the plurality of blades of the at least one cyclorotor in response to the transmitted wind data. Also, a communication system can be configured to initialize and maintain a wireless link with one or more ground stations.

The architecture of the robotic system can include four sides of the frame that define a rectangular shape. In some examples, at least one cross-member can extend between opposing sides of the frame. The four sides can define a four-sided rectangular box with a pair of opposing openings, which can allow interior access to the internal components of the robotic system.

In some examples, the frame comprises four corner connectors, with each corner connector coupling adjacent ones of the first, second, third, and fourth sides of the frame. The support arms can extend through the corner connectors in some examples. Sides of the frame can be unitary and/or they can include at least two spaced-apart parallel members, preferably coupled together at the corner connectors.

Each of the first, second, third, and fourth sides of the frame have a width and a length, and the respective length of each of the first, second, third, and fourth sides is three to ten times greater than the respective width, or in some cases, five to eight times greater than the respective width.

In other examples, a modular, hybrid robotic system for inspecting a structure is provided, with the system including a rigid frame, a modular propulsion system associated with a flight mode of the robotic system, the propulsion system comprising a plurality of propellers, a modular locomotion system associated with a climbing and/or driving mode of the robotic system, the locomotion system comprising a plurality of wheel systems, each wheel system comprising a support leg coupled to the rigid frame and at least one wheel coupled to the support leg, and a modular floating system associated with a swimming mode of the robotic system, the modular floating system comprising at least one buoyant member coupled to the rigid frame. The modular propulsion system, modular locomotion system, and modular floating system can be added to or removed from the robotic system depending on a requirement associated with the structure to be inspected.

Various methods are provided as well, including a method of coupling or removing a modular propulsion system associated with a flight mode of the robotic system to or from the frame, the propulsion system comprising a plurality of propellers, coupling or removing a modular locomotion system associated with a climbing and/or driving mode of the robotic system to or from the frame, the locomotion system comprising a plurality of wheel systems, each wheel system comprising a support leg coupled to the rigid frame and at least one wheel coupled to the support leg, and coupling or removing a modular floating system associated with a swimming mode of the robotic system to or from the frame, the modular floating system comprising at least one buoyant member coupled to the rigid frame.

DETAILED DESCRIPTION

Figure 1:
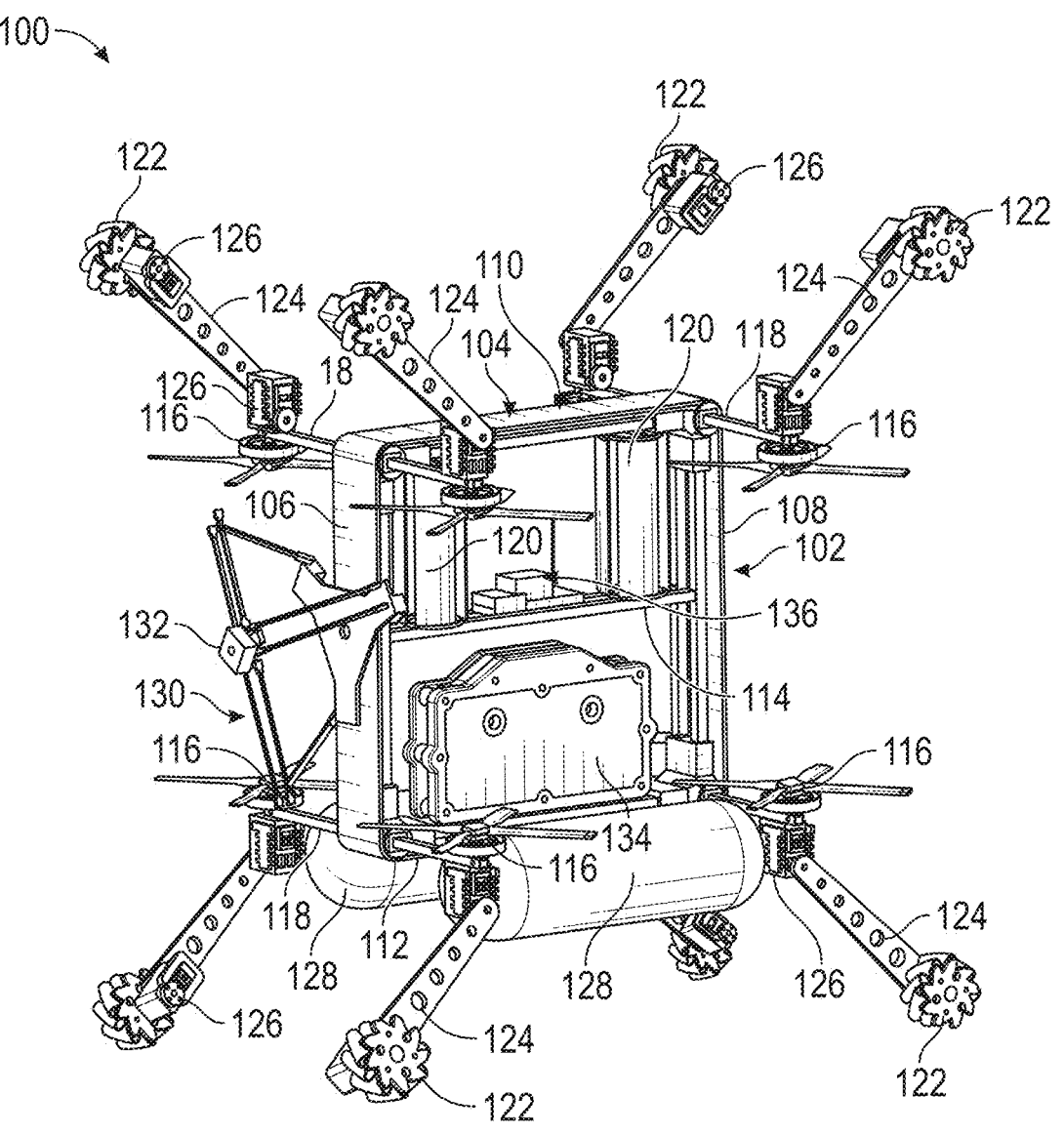
FIG. 1 shows a perspective view of an exemplary robotic system.

For purposes of this description, certain aspects, advantages, and novel features of the embodiments of this disclosure are described herein. The described methods, systems, and apparatus should not be construed as limiting in any way. Features, characteristics, and/or groups described in conjunction with a particular aspect, embodiment or example are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

As used herein, the term "and/or" used between the last two of a list of elements means any one of, or any combination e of, the listed elements. For example, the phrase "A, B, and/or C" means "A," "B," "C," "A and B," "A and C," "B and C," or "A, B, and C."

As used herein, the terms "attached" and "coupled" generally mean physically connected or linked, and do not exclude the presence of intermediate elements between the attached/coupled items unless specifically stated to the contrary (e.g., directly coupled).

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

As used herein, the term "propulsion system" refers to any system capable of providing thrust to lift and/or control the movement and/or orientation of the disclosed robotic systems, such as a plurality of propellers (or fans).

As used herein, the term "structure" refers to any physical structure capable of remote inspection by the robotic systems described herein, including for example, bridges, dams, skyscrapers, wind turbine towers, nuclear power plants, tunnels, electrical poles, ships, gas/oil tanks/piles, and other civil structures or large equipment.

As used herein, the term "control system" can refer to one or more systems of control electronics that can incorporate separate low-level and high-level controllers, a single controller, and/or a plurality of controllers for respective subsystems and components of the robotic systems described herein. A low-level controller can be configured to perform, for example, receiving velocity and/or heading commands from the high-level controller, generating PWM control signals for the motors, reading one or more navigation sensors, transmitting navigation sensor data to the high-level controller, analyzing navigation sensor data to determine velocity and/or heading information, and/or transmitting velocity and/or heading information to the high-level controller. A high-level controller or on-board computer can be configured to perform management of the communication subsystem, unidirectional or bidirectional communication between the robotic system and a ground station, communication with one or more other robotic systems, providing instruction to the low-level controller, receiving data from the low-level controller, analysis of sensor data, fusion of data from navigation sensors (e.g., using EKF), system sensors, and/or executing navigation procedures.

The control system described herein can include various control subsystems, such as a "navigation control system" that can perform basic point-to-point navigation along a prescribed path, as well as advanced navigation procedures for functions such as wind compensation, edge avoidance, path planning, joint traversal, obstacle negotiation, route planning, linear traversal, aerial traversal, or traversal of a structural frame.

Frequent inspection and maintenance is required to warrant the safety and longevity of various structures. These tasks are generally performed manually by professional human inspectors who visually inspect damages and detect faults on and/or inside these structures. Because these inspections are manual, they can be time-consuming, costly, and risky for those performing the inspections. For example, it is highly dangerous for an inspector to climb up and hang on cables to inspect the far reaches of bridges, dams, skyscrapers, wind turbine towers, nuclear power plants, tunnels, electrical poles, etc. Even the inspection of less complicated structures, such as ship shells and gas/oil tanks/piles can be highly challenging due to their size and/or location at the time of inspection.

The systems and methods disclosed herein provide more efficient and cost-effective approaches for developing, constructing, inspecting, and maintaining civil structures and other large equipment, including, for example, bridges, wind turbines, electric towers, oil rigs, and ships.

The robotic systems and methods disclosed herein are capable of, in some embodiments, flying, climbing, and swimming to perform quality inspection of various structures. The ability to perform each of these functions permits the robotic systems to adapt to variable and complex architectures of a variety of different structures. In some examples, the systems are capable of climbing, flying, and swimming. In this manner, a climbing function can permit a variety of in-depth contact-based inspection, a flying function can facilitate a flexible navigation to and from structures, and a swimming function can be utilized for approaching underwater parts of a structure. During one or more of these functions, data can be collected by sensors, such as cameras and other sensors. In some embodiments, a manipulator (e.g., a 360-degree manipulator) can be integrated for 3D touched-based inspection. In some embodiments, a manipulator (e.g., a 360-degree manipulator) is attached to a loop conveyor.

In some embodiments, to optimize the load during use, some or all of these features and/or functions can be modular. Thus, for example, depending on the particular job, some components can be omitted and/or added to meet the requirements of the job. In addition, different energy sources can be utilized, depending on the duration and/or energy required to perform a particular task.

In some embodiments, as discussed herein, the robotic system can carry and deploy sensors to collect data (visual, vibrations, hidden cracks, fatigue defects, etc.) for civil structure health monitoring. In addition, hybrid movements can be incorporated into the compact designs disclosed herein, which provide flying, climbing/crawling and swimming modes/functions to allow the robotic system to perform inspections of various complex structures. As described herein, the flying function can be provided with global navigation to permit the robotic system to conduct global 3D inspection and transit easily from one structural member to another, while the climbing function can be exploited in local areas for landing and collecting contact-based data to allow the robotic system to perform in-depth inspections on any surface including ceilings, verticals, inclines, or grounds. Moreover, the swimming function can, in some embodiments, enable the robotic system to float on the water and/or deploy one or more modules for deep underwater inspection of bridge bases or culverts.

FIG. 1 illustrates a robotic system 100 that is capable of performing flight, climbing, and swimming functions. The robotic system comprises a main body 102 that includes a frame 104. In addition to the frame, the main body 102 can include cover plates (not shown) to protect internal components from exposure to the elements. However, preferably, there are no cover plates and the robotic system has an open architecture which reduces weight and provides increased access to components for replacement, repair, and to achieve the modularity described herein.

The frame 104 is a rigid structure formed from four side walls 106, 108, 110, 112. The frame 104 can also include one or more cross members 114 that extend between opposing side walls to provide additional rigidity and/or to receive one or more components of the system mounted thereon.

A plurality of propellers 116 can be mounted to the frame 104. In FIG. 1, eight propellers 116 are provided, with four propellers on a first side of the frame 104 (e.g., an upper side) and four propellers on a second side of the frame 104 (e.g., a lower side). The propellers can be mounted on a plurality of support arms 118, which are mounted to the frame 104. Support arms 118 extend from four corners defined by the side walls 106, 108, 110, 112 of the frame. In some embodiments, such as the one shown in FIG. 1, a single support arm 118 extends outward from the frame 104 on both sides to support a propeller 116 on each side of the frame 104. As shown in FIG. 1, each propeller 116 can comprise four blades in an X configuration, with each propeller 116 facing another propeller 116 above or below it.

As shown in FIG. 1, one or more cyclorotors 120 can be provided to help control horizontal forces on the robotic system 100. In FIG. 1, two cyclorotors 120 are mounted on the same cross member 114, with the two cyclorotors 120 being spaced apart and located adjacent opposing side walls 106, 108. The flight function achieved by the propeller and cyclorotors shown in FIG. 1 can achieve 360-degree force control by tuning cyclorotor speed and blade pitch angles. This permits the robotic system 100 to provide greater stabilization during flight under gusty winds, as well as provides horizontal forces to position the robotic system adjacent to a structure body when landing on vertical surfaces.

The propeller arrangement on the frame 104 provides high load performance while saving propeller space in the system's general architecture. For example, the propeller arrangement with propeller pairs does not interfere with the support legs for the wheels mounted on opposing sides of the support arms. In addition, the pair of cyclorotors provide aerodynamic force vector control capability without taking up much space and/or without interfering with the additional system components. The twin cyclorotors can effectively reduce and/or eliminate the angular momentum imbalance of the system, either acting alone or together.

The robotic system 100 of FIG. 1 also includes a plurality of wheels 122 that are mounted on a plurality of support legs 124. The support legs 124 can be mounted to the frame 104. In the example shown in FIG. 1, each support leg 124 is mounted to the frame 104 through one of the support arms 118. In particular, as shown in FIG. 1, eight support legs 124 can be mounted on a respective end of each support arm 118 in opposition to a respective mounted propeller 116.

A plurality of actuators 126, such as servo motors, can be provided to cause the wheels to move and/or to cause the support legs 124 to adjust their position to, for example, to adapt to uneven or inclined surfaces. As shown in FIG. 1, in some embodiments, an actuator 126 can be provided at each end of the support legs 124 to facilitate movement of the support legs 124 and wheels 122. The position of the plurality of the eight support legs 124 relative to the main body 102 provides a climbing/mobile function for the four sides of the frame 104. In addition, mecanum wheels can be provided so that the robotic system 100 is capable of multi-directional movement when climbing and/or moving. The wheels 122 can also be customized to adapt special conditions such as traveling on railways or transmission cables. Once landing on a surface, the robotic system 100 can switch from flight mode to a more stable climbing/mobile function with a plurality of wheels 122 (e.g., four) engaged with the surface on which the robotic system has landed. The four surface-engaging wheels enable the robotic system to travel locally along the surface to a desired position and/or to conduct measurements while moving along the surface.

Also shown in FIG. 1 is the use of one or more buoyant members 128 (e.g., buoys). FIG. 1 shows a pair of buoyant members 128, with one on each side of the frame 104. The buoyant members 128 can be directly coupled to the frame 104, the support arms 118, and/or coupled indirectly to the frame 104 though one or more support members that extend from one buoyant member 128 to the other.

In swimming mode, navigation and maintaining position is preferably achieved through the operation of a fluid propulsion system, which may include, for example, the cyclorotors and/or propellers. For example, in some embodiments, the cyclorotors can cause movement of the robotic system in water. Alternatively, however, movement of the robotic system 100 in water can be achieved by one or more propellers, which may be the same or different than the propellers used in flight mode.

To provide for additional data collection, one or more delta manipulators 130 can be coupled to the frame. The delta manipulator can comprise three arms coupled to joints at a base and coupled together to rotate 360 degrees for flexible deployment an end effector of the delta manipulator 130. One or more sensors or other equipment can be mounted on the end effector which can be deployed adjacent to and/or in contact with a surface to be inspected. FIG. 1, for example, illustrates a sensor or other equipment 132 on the end effector of the delta manipulator 130.

In some embodiments, the four side walls 106, 108, 110, 112 can comprise an endless loop conveyor 155 that is configured to rotate about frame 104 so that one or more components of the robotic system (e.g., a sensor, delta manipulator, etc.) can be moved to different positions relative to the frame. Thus, for example, referring to FIG. 1, a continuous external surface of the belt (collectively identified in FIG. 1 by 106, 108, 110, 112) can rotate about frame 104 to transport delta manipulator 130 from a first location to a second, different location relative to frame 104. In this manner, one or more components of the robotic system can be effectively used and/or deployed at different positions. For example, an actuator can be activated to cause the belt to rotate about the frame so that delta manipulator 130, coupled to the external surface of the belt, can be moved from one side (e.g., the left side shown in FIG. 1) of the robotic system to another side (e.g., the top, bottom, and/or right side of the robotic system shown in FIG. 1). In addition, because the endless conveyor belt is continuous, a component mounted to the external surface of the belt can be moved to any position on any side of the robotic system. Rotation of the endless loop conveyor system 155 about frame 104 can be achieved by any suitable actuation system, such as an electric motor mounted to frame 104.

The shape of robotic system provides for significant operational flexibility. For example, the rectangular shape is convenient to approach structures in any surface orientation: ceiling, wall, ground, or water. In addition, the generally open architecture allows for a lightweight robotic system with ready access to receive, remove, and/or replace components. For example, FIG. 1 shows a power source 134 positioned on the frame. Any suitable power source can be used, such as a battery (rechargeable or otherwise) or a hydrogen fuel cell. Because of the open design, the power source can be easily accessed and replaced if necessary. An on-board computer 136 can also be coupled to the frame 104. The on-board computer can function as a high-level controller. As discussed herein, the on-board computer can comprise a control system for navigation and data collection, and the on-board computer can communicate with various low-level and/or high-level controllers to achieve the features and operations disclosed herein. The on-board computer 136 can also include a wireless communication system to transfer collected data from the on-board computer 136 to a remote computer or other device (i.e., a ground station) for further processing and also to receive control commands from the ground station.

The systems described herein include a frame with a substantially rectangular shape. The term substantially modifies the rectangular shape such that rounded corners and/or some other variation of a perfect rectangular shape is permitted. However, to provide a substantially rectangular shape, the length of opposing sides of the frame should be within 5% of one another.

In some embodiments, the frame can have an open architecture as described above, which refers to an absence of covering panels or walls on at one side, but preferably two opposing sides of the frame. In some embodiments, each of the first, second, third, and fourth sides of the frame have a width and a length, and the respective length of each of the first, second, third, and fourth sides is three to ten times greater than the respective width, or in some embodiments five to eight times greater.

Figure 2:
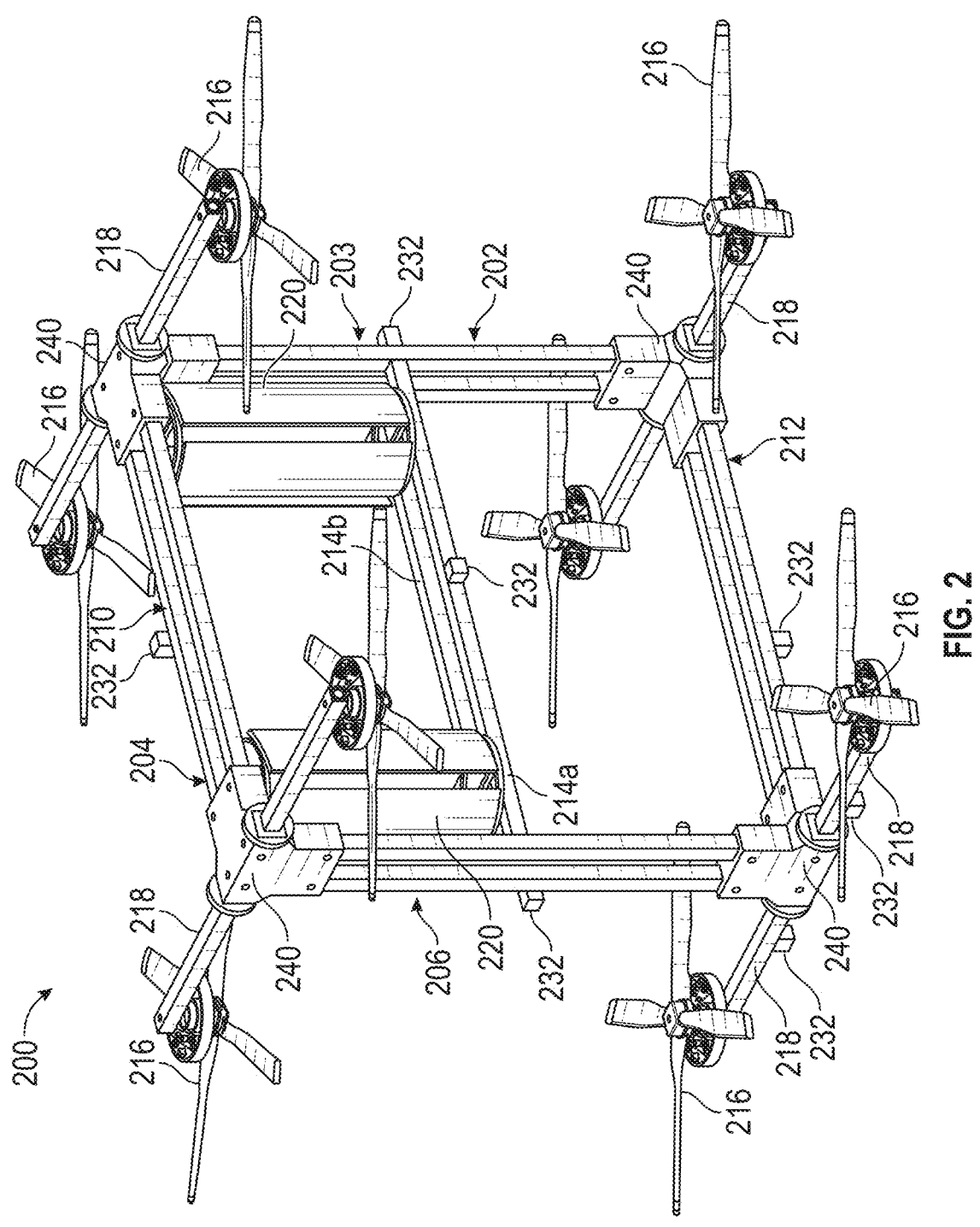
FIG. 2 shows a perspective view of an exemplary robotic system.

As noted above, the robotic system 100 can be easily modified to include more of fewer components depending on required task. For example, FIG. 2 illustrates an embodiment in which a robotic system 200 has been modified for flight mode only, with the wheels and buoyant members removed. It should be understood that the robotic system of FIG. 2 can be configured in a similar manner as FIG. 1, for example, by adding the modular climbing and/or swimming components to robotic system 200.

Robotic system 200 is similar to robotic system 100 in that it comprises a main body 202 and a frame 204. In FIG. 2, frame 204 is that is a rigid structure formed from four side walls 206, 208, 210, 212. In contrast to frame 104, each side wall 206, 208, 210, 212 of frame 204 comprises a pair of parallel, spaced-apart members. Adjacent spaced-apart members are joined by corner connectors 240 that receive the space-apart members in a rigid, fixed manner. Corner connectors 240 can comprise two pairs of openings, with the pairs arranged at about 90 degrees from each other to receive respective spaced-apart members in the fixed orientation shown in FIG. 2.

The frame 204 can also include one or more cross members 214a, 214b that extend between opposing side walls to provide additional rigidity and/or to receive one or more components of the system mounted thereon. In FIG. 2, cross members 214a, 214b are shown as two parallel spaced-apart members, positioned at the same height along side walls 206, 208.

Similar to frame 104, a plurality of propellers 216 can be mounted to frame 204. As shown in FIG. 2, the propellers can be mounted on a plurality of support arms 218, which are mounted to the frame 204 through corner connectors 240. Support arms 218 extend from each corner connector 240 (e.g., as a single arm that extends through respective corner connectors 240 and extends outward from the corner connector 240 on both sides). Each propeller 216 can comprise four blades in an X configuration, with each propeller 216 facing another propeller 216 above or below it. Similar to robotic system 100 in FIG. 1, robotic system 200 can also comprise one or more cyclorotors 220 to help control horizontal forces on the robotic system 200.

As discussed above with regard to FIG. 1, one or more sensors or other equipment can be mounted on a delta manipulator to deployed adjacent to and/or in contact with a surface to be inspected. The robotic system of FIG. 2 can also include one or more delta manipulators on one or more side walls in the same manner as that of FIG. 1. For example, delta manipulators, such as that shown in FIG. 1, can be on opposing side walls (e.g., 206, 208 or 210, 212) or adjacent side walls (e.g., 206, 210 or 208, 212), or both.

In addition to sensors on delta manipulators, one or more sensors 232 can be attached to the frame 204 at various locations. For example, FIG. 2 shows a number of different sensor 232 locations on frame 204, including on the side walls (either facing outward or inward depending on the sensor's requirements/purposes), on cross members 214a and/or 214b, and/or on one or more support arms 218. During operation of the robotic system, data (visual, vibrations, hidden cracks, fatigue defects, etc.) can be collected by these sensors 232, such as cameras and other sensors.

Sensors 232 can comprise any suitable sensor for obtaining desired information about a structure and its condition. For example, the sensors can comprise visual inspection systems such as video cameras, thermal cameras, RGB-D cameras. In some embodiments, two or more of the same or different cameras can be provided at different positions on the frame to provide additional details of the area of the structure being inspected. The sensors can also include LiDAR and laser scanners for 3D data capture, RADAR, ultrasonic sensors, and/or infrared sensors.

Other types of sensors that can be used in these systems, either on the frame and/or in connection with a delta manipulator or other moveable component can include, for example, microphones, strain gauges, accelerometers, and electrical resistivity sensors.

Preferably, the system includes two or more different types of sensors since a particular type of sensor may not be adequate to identify all types of defects. In some embodiments, three or more different sensors are provided on the frame of the robotic system.

The system can also include one or more sensors 232 to facilitate movement and navigation of the system in the air, on ground/structure, and/or in the water. Navigation sensors can be provided in any suitable position on the frame, such as those shown in FIG. 2, and can include, for example, inertial measurement unit (IMU) sensors, global positioning system (GPS) sensors, and/or ultra-wideband (UWB) sensors.

The operation of the robotic system can be autonomous (e.g., no operator required) or semi-autonomous (e.g., with an operator directing one or more actions, such as movement of the robotic system and/or data collection). Of course, a semi-autonomous robotic system can perform some autonomous actions. The degree of operator invention required for a semi-autonomous robotic system can vary depending on the desired use of the robotic system and/or the structure being inspected.

Figure 3:
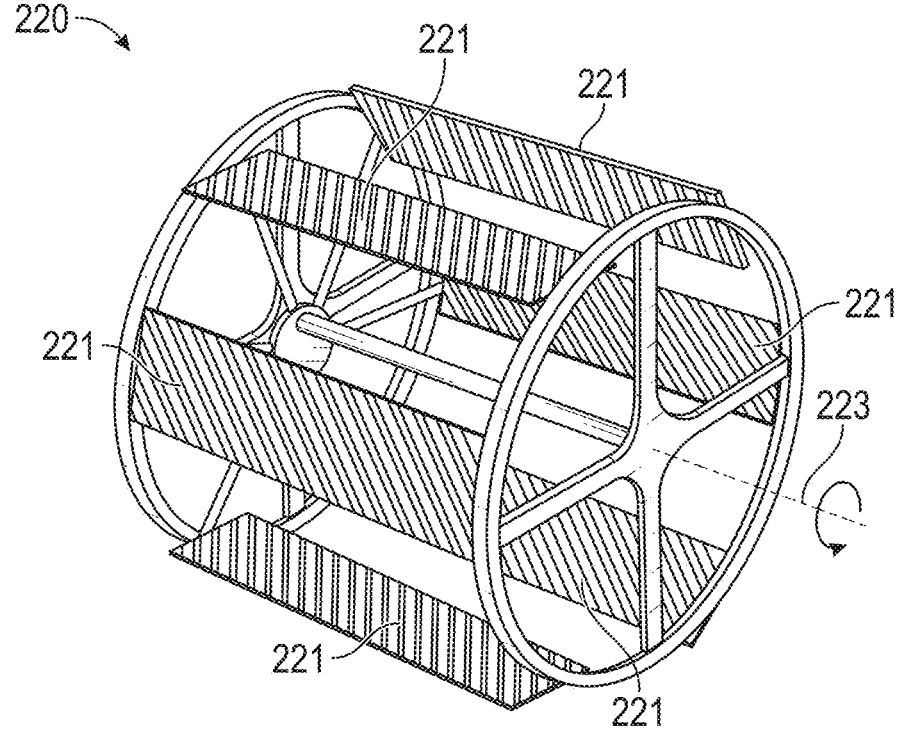
FIG. 3 illustrates an exemplary cyclorotor.

FIG. 3 illustrates an exemplary cyclorotor 220 can be used with the systems described herein. As shown in FIG. 3, the cyclorotor 220 can comprise a plurality of blades 221 and changes in the blade pitch angles and rotation speed of the cyclorotor 220 about longitudinal axis 223 provides 360° force control for the system during operation.

Figures 4A, 4B, 4C:
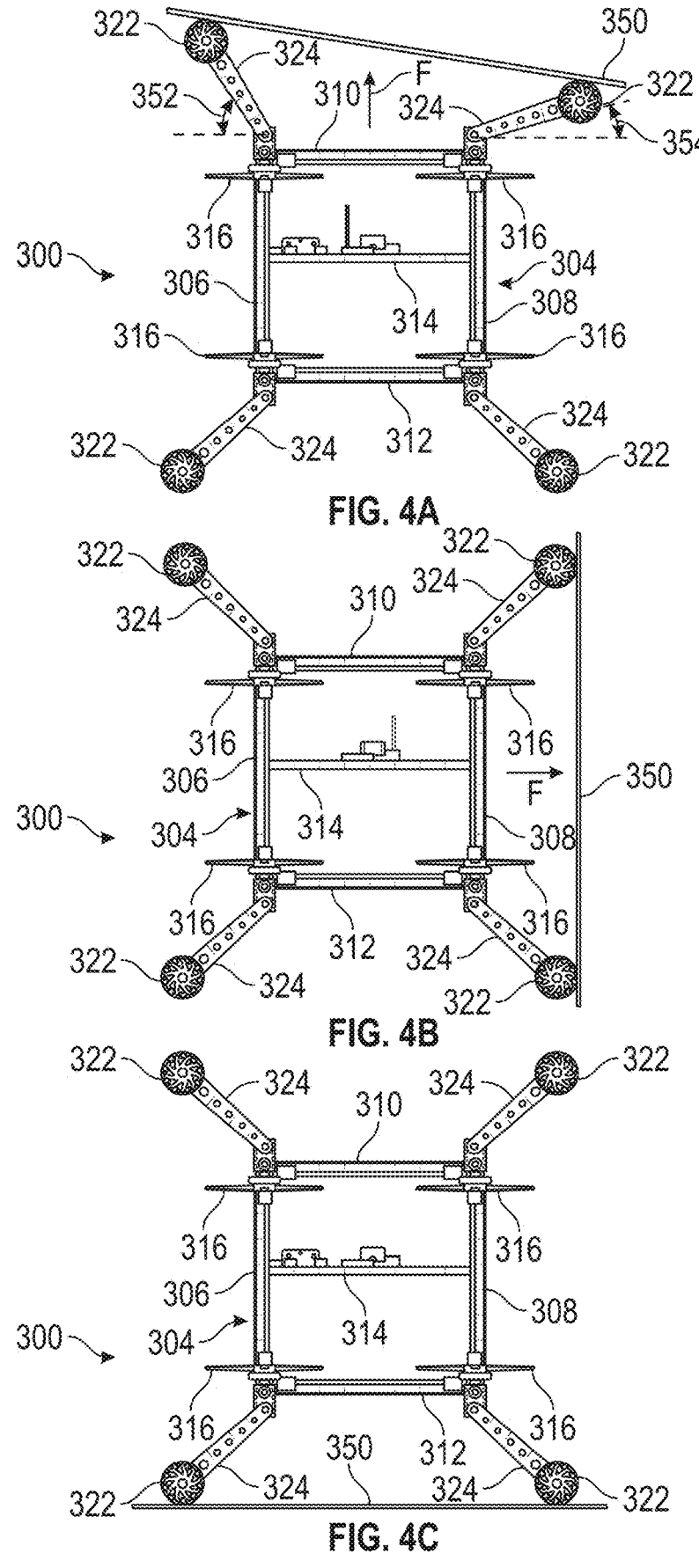
FIGS. 4A-4C show an exemplary robotic system capable of engaging with surfaces at various orientations.

FIGS. 4A-4C illustrate an exemplary robotic system 300 engaging with various surfaces. Robotic system 300 is similar to robotic system 100 in that it comprises a frame 304 with a rigid structure formed from four side walls 306, 308, 310, 312 and one or more cross members 314. A plurality of propellers 316 are coupled to frame 304 in the manner described above with respect to FIG. 1. For convenience, some components described above are omitted from this embodiment, such as cyclorotors, buoyant members, sensors, etc. However, it should be understood that the omitted features that are present in any of the other embodiments here can also be included in robotic system 300.

The robotic system 300 also includes a plurality of wheels 322 that are mounted on a plurality of support legs 324 extending from support arms associated with respective ones of the propellers 316. As described above with respect to FIG. 1, a plurality of actuators, such as servo motors, are operable to move the wheels to and/or adjust the position of the support legs. The adjustment of the position of the support legs allow robotic system 300 to adapt to uneven or inclined surfaces.

For example, FIG. 4A shows the support legs on an upper portion of frame 304 to adapt to a surface 350 (e.g., a ceiling surface or other horizontal or inclined surface) when the robotic system approaches the surface 350 from below. The surface can be any surface at or adjacent to the area to be inspected, such as a flat rigid surface, a railway surface, or a transmission cable.

To cause the upper wheels 322 of robotic system 300 to contact the surface 350, an upward force F (e.g., vertical thrust) is applied by the plurality of propellers 316. Since the surface 350 is inclined at an angle, the support legs 324 are moved so that a first support leg (or first pair of support legs) is at a first angle 352 that is different from a second angle 354 of a second support leg (or second pair of support legs) as shown in FIG. 4A. In this manner, the robotic system 100 can adapt to any inclined surface when approach that surface from below.

FIG. 4B shows wheels 322 in contact with another surface 350 (e.g., a vertical surface) when the robotic system approaches the surface 350 from the side. To cause the upper wheels 322 of robotic system 300 to contact the surface 350, a horizontal (or substantially horizontal) force F (e.g., horizontal thrust) is applied by the plurality of propellers 316 towards the surface 350. Since the surface 350 is vertical, the support legs 324 of the contacting wheels can be presented at the same or similar angles. Of course, if the surface 350 was not vertical, the support legs can adapt to that surface in the manner described above with respect to FIG. 4A.

FIG. 4C shows wheels 322 in contact with another surface 350 (e.g., a horizontal/ground surface) when the robotic system 300 lands on or otherwise approaches the surface 350 from above. In some cases, the weight of the robotic system 300 can provide sufficient downward force to maintain the position of the robotic system on the horizontal surface. However, under some environmental or structural conditions, such as windy conditions and/or low-friction surfaces, a downward force (e.g., downward thrust) can be applied by the plurality of propellers 316 towards the surface 350 to provide additional contacting forces between the wheels 322 and the surface 350.

Once landing on a surface, the robotic system 100 can switch from flight mode to a more stable climbing/mobile function with a plurality of wheels 322 (e.g., four) engaged with the surface on which the robotic system has landed. The four surface-engaging wheels enable the robotic system to travel locally along the surface to a desired position and/or to conduct measurements while moving along the surface.

Figures 5A, 5B, 5C:
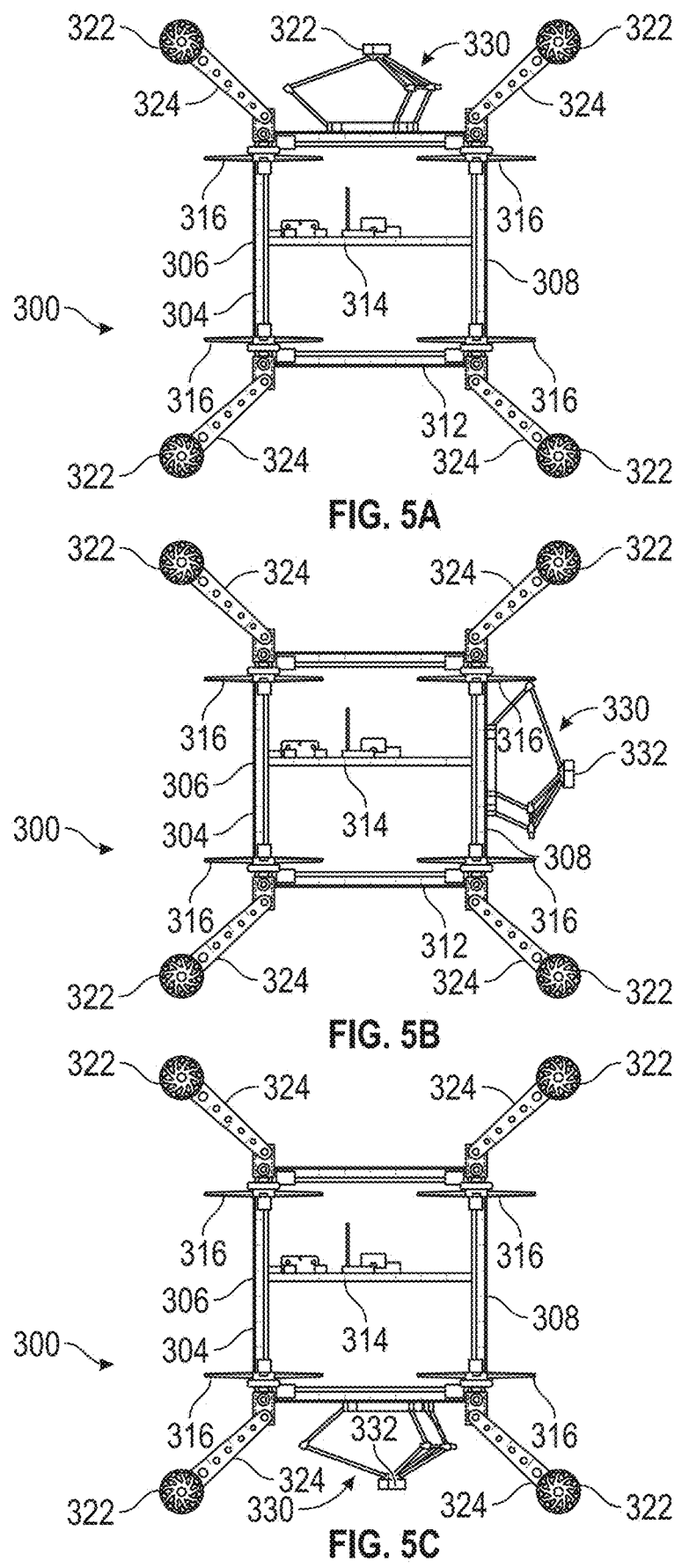
FIGS. 5A-5C show an exemplary robotic system with one or more delta manipulators at different locations.

As discussed above with regard to FIG. 1, one or more sensors or other equipment 332 can be mounted on a delta manipulator 330 to deployed adjacent to and/or in contact with a surface to be inspected. As shown in FIGS. 5A-5C, one or more delta manipulators can be provided on any (or more than one) of the side walls 306, 308, 310, 312). In some embodiments, the sensor and/or other equipment 332 can be capable of taking a sample from the surface that is being inspected.

Depending on the particular application and requirements, the delta manipulator can be replaced by or supplemented with other extendable applications, modules, tool sets such as continuum manipulators. For example, as discussed below, in some applications, a zippermast mechanism can replace or supplement a delta manipulator.

Figures 6A, 6B:
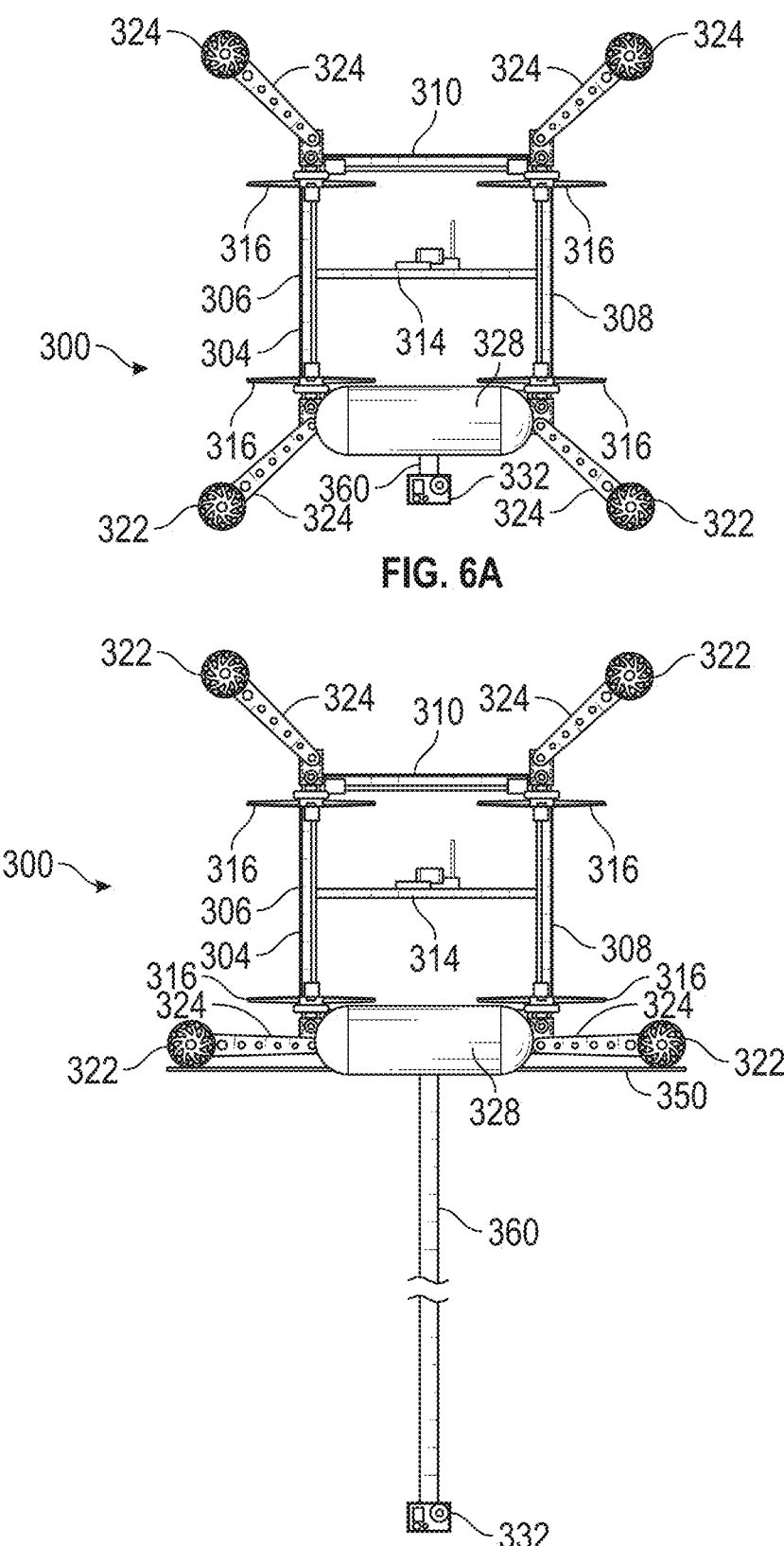
FIGS. 6A-6B show an exemplary robotic system capable of floating and/or moving on a fluid.

FIGS. 6A and 6B illustrate a robotic system 300 with one or more buoyant members 328 (e.g., buoys). As discussed above, the buoyant members 328 can be directly coupled to the frame 304, the support arms 318, and/or coupled indirectly to the frame 304 though one or more support members that extend from one buoyant member 328 to the other.

In swimming mode, one or more extendable members 360, such as a zippermast mechanism, can be provided to deploy one or more sensors or other equipment to greater depths for underwater inspection of, for example, footings and piles of bridges or other structures. As shown in FIG. 6A, the extendable member 360 can be stored in a relatively small space (e.g., such that it does not interfere with the ability to climb/move using the wheels 322. However, when robotic system 300 is floating on the surface 350 of water, the extendable member 360 can be deployed to a length that is many times its storage length (e.g., 5-30 meters).

Figures 7A, 7B:
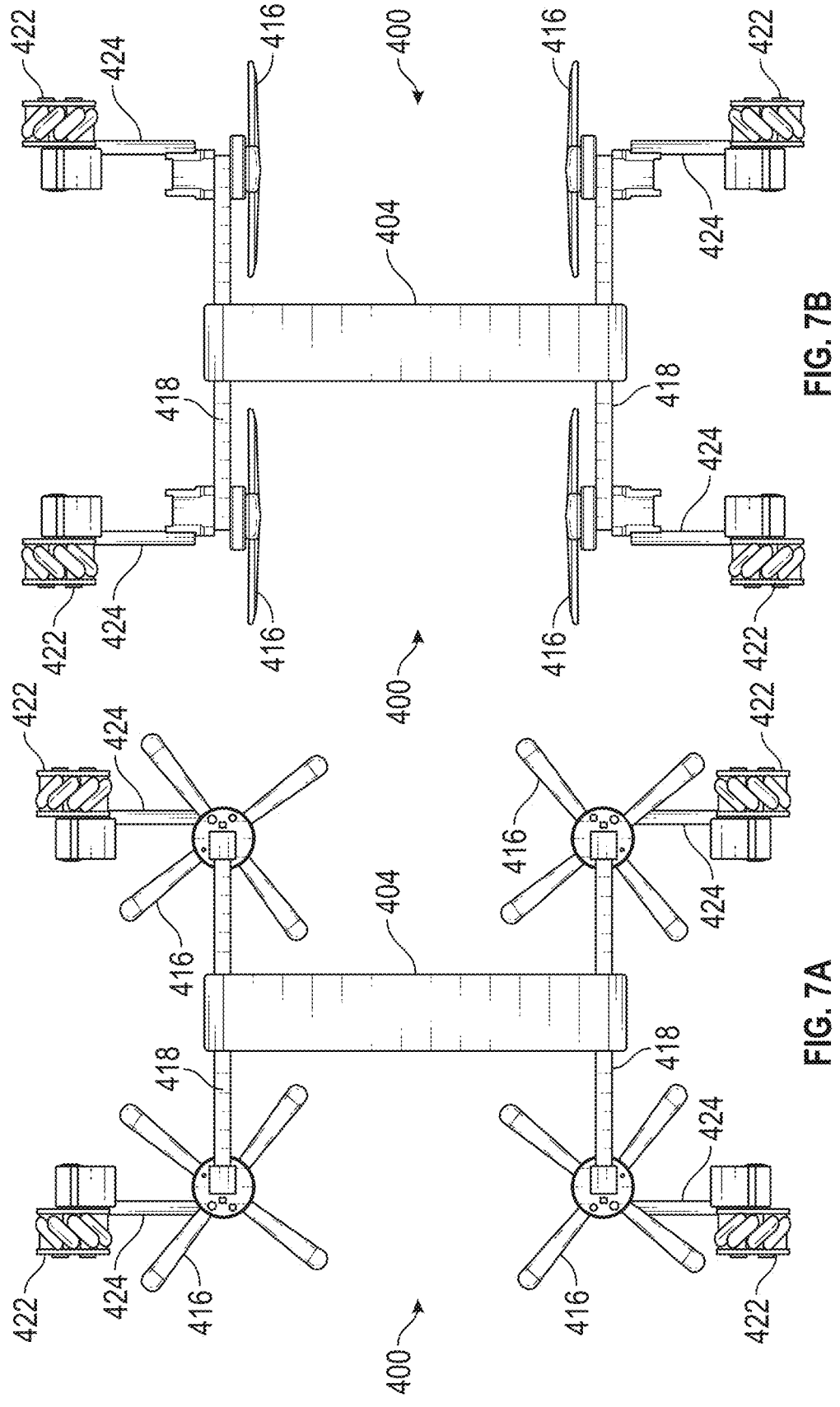
FIGS. 7A-7B show an exemplary robotic system with climbing and/or surface locomotive capabilities.

FIGS. 7A and 7B illustrate an exemplary robotic system 400 using mecanum wheels 422 that provide multi-directional movement when climbing and/or moving. Similar to other embodiments, a plurality of propellers 416 can be mounted to frame 404. The propellers 416 can be mounted on a plurality of support arms 418. Similar to other systems described herein, robotic system 400 can also comprise one or more cyclorotors to help control horizontal forces on the robotic system 400.

In operation, when traveling on surfaces, a climbing/mobile mode can be activated and the wheels 322 can be driven to cause the robotic system to move along the surface (either alone or in combination with thrust from the propellers). In this mode, the robotic system 400 is highly maneuverable because the mecanum wheels permit movement in a variety of different directions and with a zero turn radius. In addition, because of the symmetry of the robotic system 400 with respect to the arrangement of wheels, the locomotion of the robotic system 400 on any side of the robotic system is the same. For example, FIG. 7A illustrates a top view of the robotic system 400 showing four mecanum wheels 422 contacting a surface, while FIG. 7B illustrates a side view of the same robotic system 400 showing a different set of four mecanum wheels 422 contacting a surface. This permits the robotic system to operate the same on any side, and provide locomotion in the mobile mode regardless of whether the surface is horizontal or vertical.

Control of flight and other movement of the novel architecture of the robotic systems described herein can be achieved by a control system, sometimes referred to as a navigation control system. The navigation control system comprises one or more logical control modules that output signals to actuators such as the propulsion system (e.g., propellers and/or cyclorotors), the mobile locomotion system (e.g., wheels), and/or the fluid propulsion system (e.g., propellers and/or cyclorotors).

Controlling for wind in various environments is a challenge, particularly in gusty and/or high wind conditions such as those that are present along rivers, seas, and/or high altitudes. The systems and methods disclosed herein can achieve greater control than conventional systems, in particular when used in combination with the unique architecture of the disclosed systems.

As shown in FIG. 6, one or more wind sensors can be provided at the locations described herein for sensors. The wind sensors are configured to obtain information about wind magnitude and wind direction. Signals from the wind sensors can be directed to the navigation control system which determines an appropriate correction. For example, the navigation control system can be configured to cause the propulsion system (e.g., the twin cyclorotors) to generate an equal wind intensity force in the opposite direction of the determined wind direction.

Figure 8:
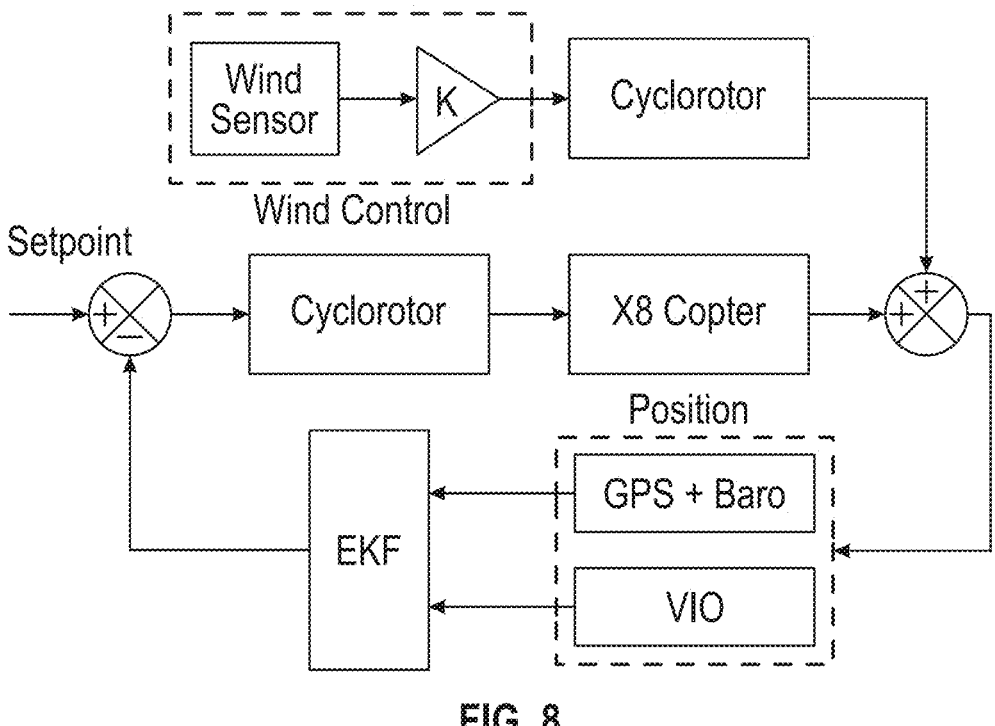
FIG. 8 illustrates an exemplary open-loop wind control diagram in which wind control information is received and used to determine an appropriate cyclorotor response.

An exemplary open-loop wind control diagram is provided in FIG. 8, in which wind control information is received and used to determine an appropriate cyclorotor response (e.g., the generation of an opposite force). As shown in FIG. 8, navigation feedback can include a combination of data received from GPS and outdoor Visual-inertial Odometry (VIO). In the embodiment shown in FIG. 8, data from GPS and VIO can be received by an Extended Kalman Filter (EKF), which makes use of advantages from each sensor. For example, GPS provides exact positions for path planning in real world mapping but can suffer from weak signals in certain conditions (e.g., when close or under large structures, decks, or truss), and in those instances VIO can assists to improve location information.

As indicated in FIG. 8, the wind controller can generate forces (such as horizontal forces) is independent with flight controller. In this manner, flight and/or location control of the system can be achieved by controlling the propulsion system and, additional wind information can independently received to provide additional cyclorotor control.

FIGS. 9A-C and FIGS. 10A-C illustrate the adaptability of the robotic system to land on different structures, including ceiling and/or horizontal surfaces accessed from below and vertical or angled surfaces accessed from a side.

Once the robotic system navigates to interested locations and is required to perform contact-based inspection such as paint thickness measurement, fatigue/hidden crack detection on a wind turbine or ground penetrating radar (GPR) scanning on a concrete bridge deck, the robotic system can land on the surface of that structure to enhance stability and close sensor distance to the surface.

When landing on a structure, the robotic system and its locomotion control system can receive information from one or more sensors to determine the location and orientation of the landing surface (e.g., whether the surface is a ceiling or wall) and enable related actuators and controllers.

For example, when "landing" on a ceiling or other surface from below (e.g., as shown in FIG. 4A), servo motors associated with the four support legs can be operated to adjust the position of the upper support legs to a desired position. In some embodiments, the movement of the support legs can be performed to maintain the robotic system in a horizontal orientation relative to the ground.

Figures 9A, 9B, 9C, 10A, 10B, 10C:
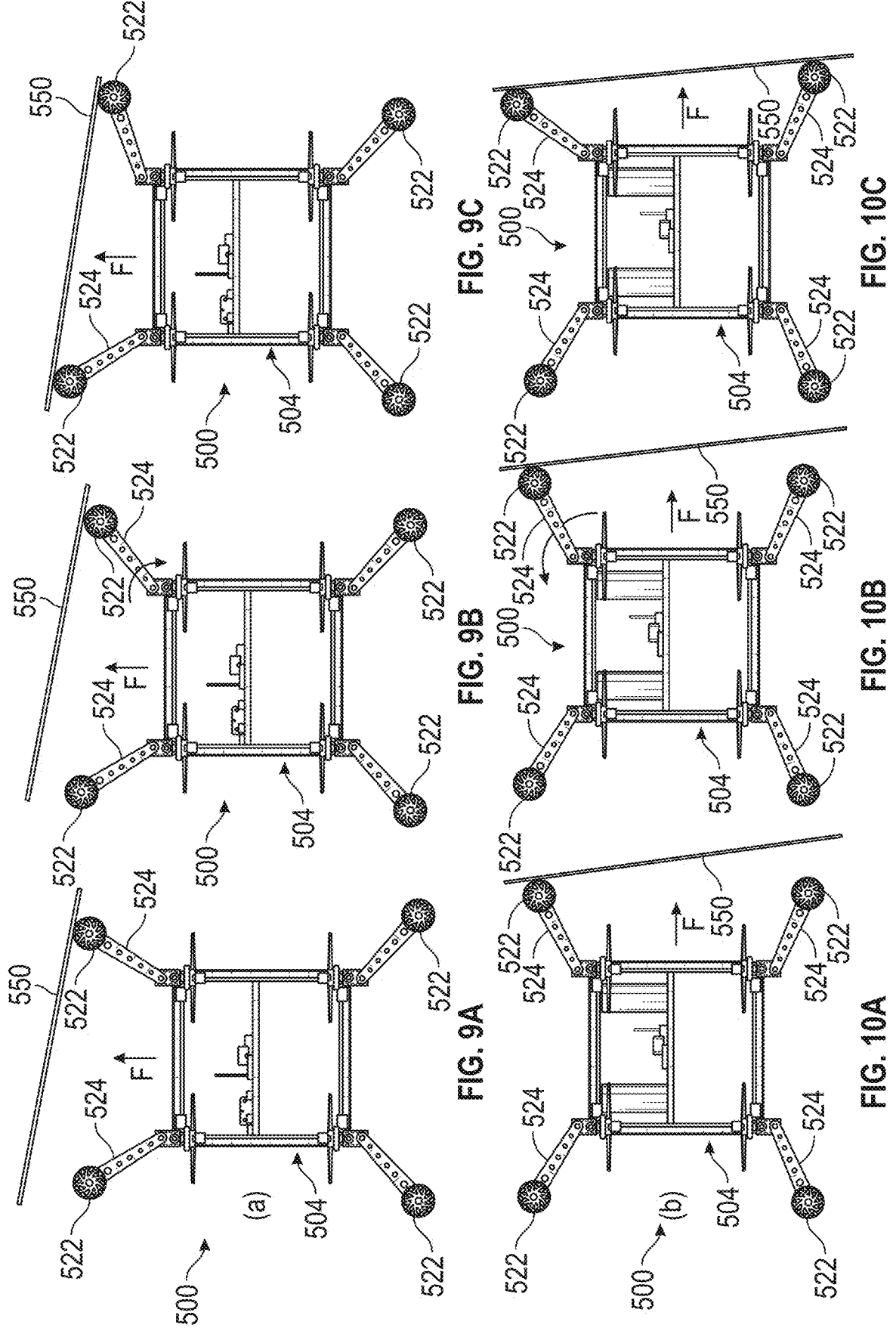
FIGS. 9A-9C show an exemplary robotic system capable of engaging with ceiling surface at various orientations.
FIGS. 10A-10C show an exemplary robotic system capable of engaging with a vertical surfaces at various orientations.

For example, FIGS. 9A-9C illustrate the relative movement of respective upper support legs 524 as a robotic system 500 approaches a ceiling surface 550. As shown in FIG. 9A, a force F (e.g., vertical thrust) moves the robotic system 500 close to the surface 550. As the robotic system 500 approaches the surface, the locomotion control system directs the actuation of the support legs 524 from a neutral orientation (FIG. 9A) to a different orientation that is appropriate to maintain a horizontal orientation of the robotic system 500. As shown in FIGS. 9B and 9C, this may include rotating one or more support legs 524 from a first angle to a second angle as discussed above with respect to FIG. 4A.

Once the robotic system has completed its landing, the locomotion control system may be operable to continue to maintain a required contacting force. The contacting force (e.g., a continued vertical thrust) generates friction between the surface and wheels 522, such that the wheels 522 can be activated to provide mobile locomotion along the contacted surface.

Similarly, FIGS. 10A-10C illustrate the landing of robotic system 500 on a vertical and/or angled surface from the side.

As shown in FIG. 10A, a force F (e.g., horizontal thrust) moves the robotic system 500 close to the surface 550. As the robotic system 500 approaches the surface, the locomotion control system directs the actuation of the support legs 524 from a neutral orientation (FIG. 10A) to a different orientation that is appropriate to maintain a horizontal orientation of the robotic system 500. As shown in FIGS. 9B and 9C, this may include rotating one or more support legs 524 from a first angle to a second angle as discussed above with respect to FIG. 4B.

Maintaining the horizontal orientation of the robotic system, as described in some embodiments herein, can reduce the need for and/or reliance on other corrective measures, such as expensive and complicated stabilization equipment (e.g., gimbals) for cameras.

Figure 11:
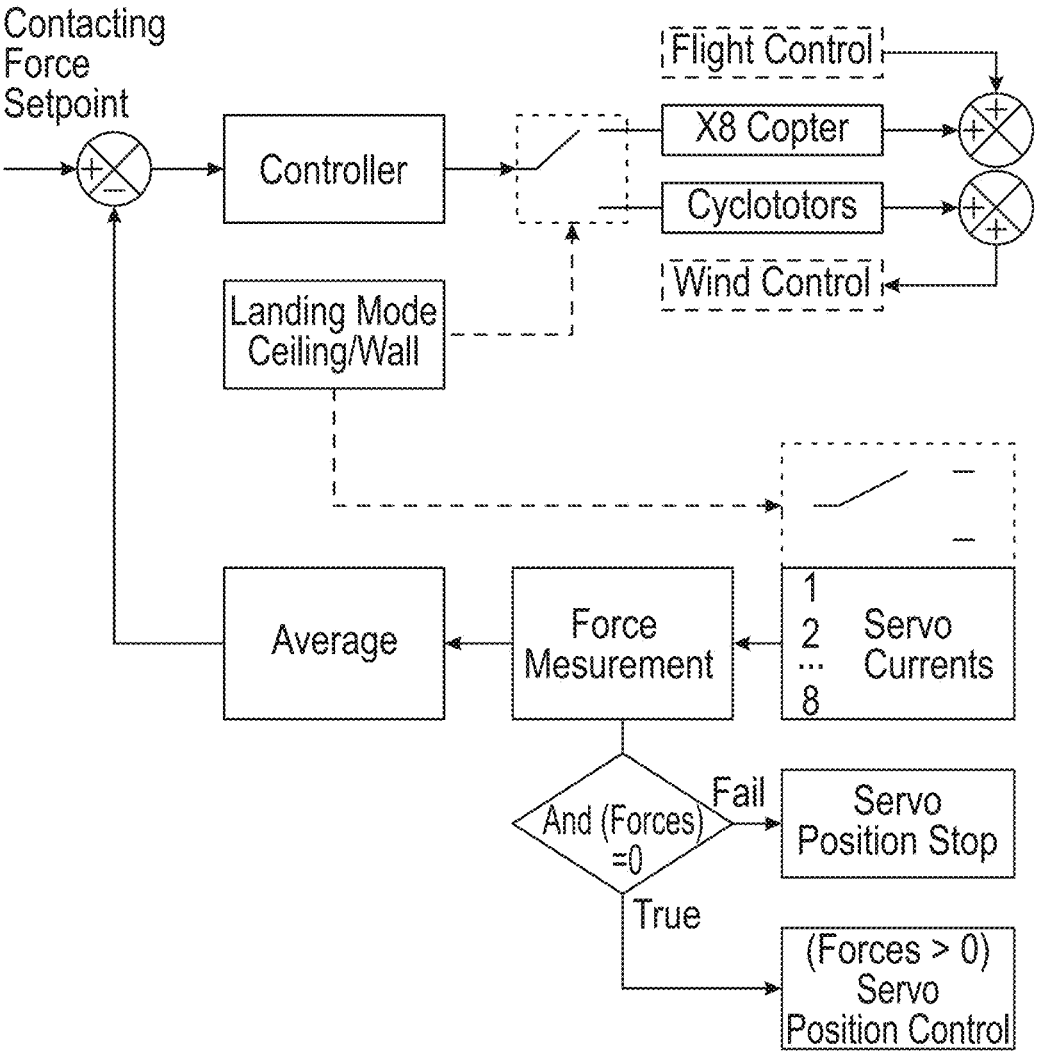
FIG. 11 illustrates an exemplary closed loop force control diagram for air landing.

FIG. 11 illustrates an exemplary closed loop force control diagram for air landing. If the robotic system 500 determines that any wheel 522 is not in contact with the surface, the respective support leg 524 can be adjusted accordingly. For example, a force measurement feedback from a servo motors associated with a respective wheel can determine that the wheel is not in contact and/or there is not sufficient contact for the required wheel engagement. As shown in FIG. 11, an adaptive function triggers a servo position control adjustment until all wheels are fully contacted. After that, the contacting force controller is active to maintain the normal force and friction between the robot and surfaces for effective mobility.

Figure 12A:
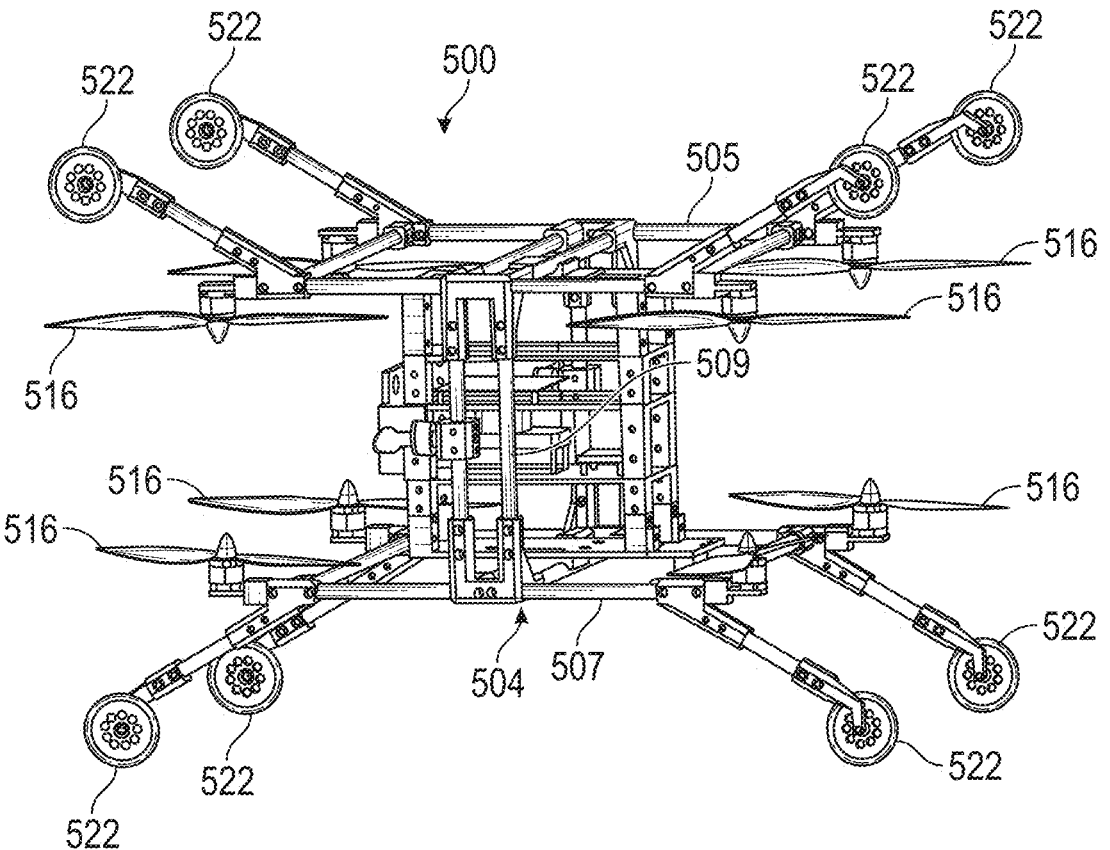
FIG. 12A illustrates a perspective view of an exemplary robotic system.

FIG. 12A illustrate another exemplary robotic system 500 with wheels 522 (e.g., mecanum wheels) that provide multi-directional movement when climbing and/or moving. Similar to other embodiments, a plurality of propellers 516 can be mounted to frame 504. Similar to other systems described herein, robotic system 500 can also comprise one or more cyclorotors to help control horizontal forces on the robotic system 500.

In FIG. 12A, the frame 504 can be define a cube-shaped structure (e.g., a cube-drone), with a first rectangular (e.g., square) frame 505 and a second rectangular (e.g., square) frame 507 coupled together by third rectangular (e.g., square) frame 509. First and second frames 505, 507 can be coupled to third frame 509 at intermediate points along respective legs of the frames.

Figure 12B:
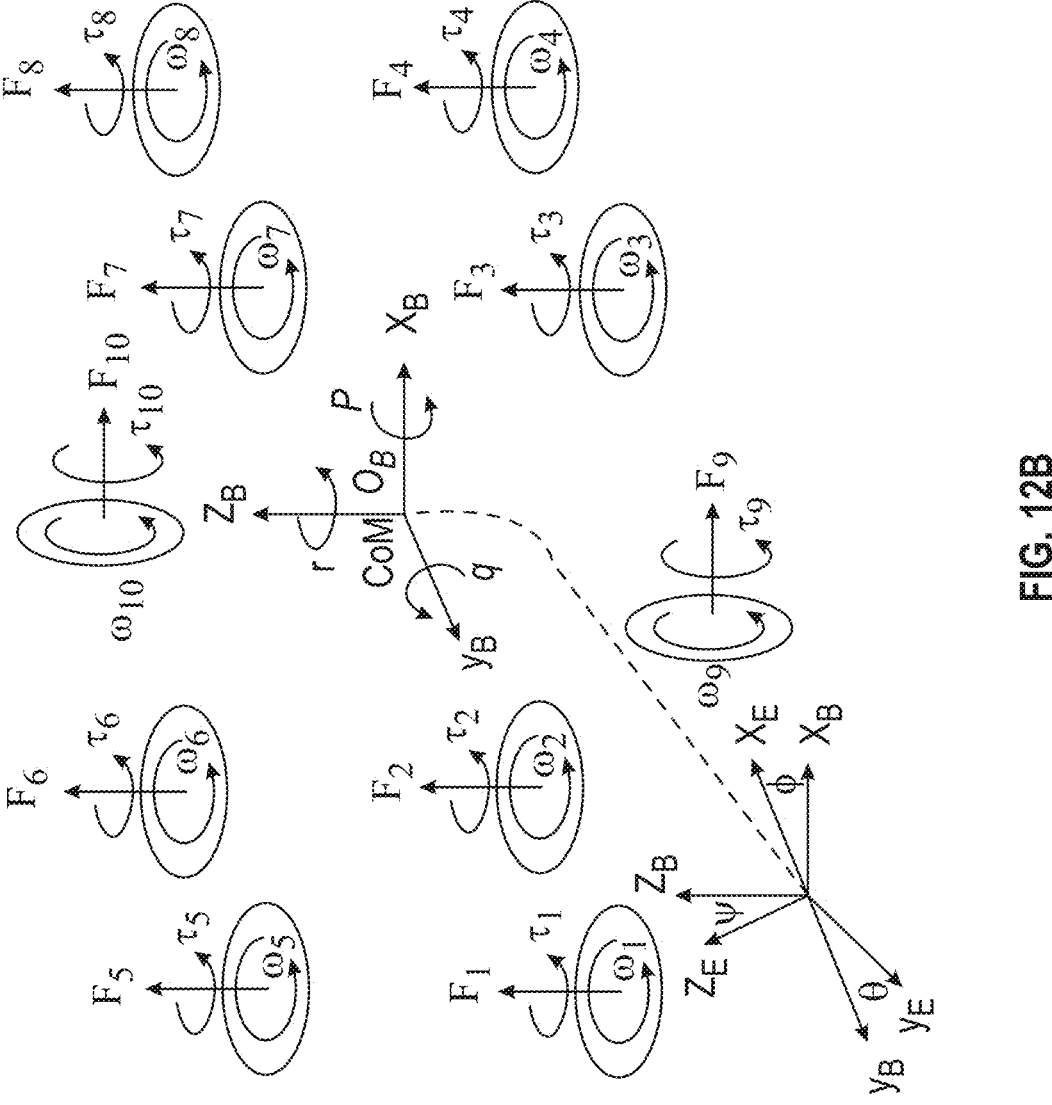
FIG. 12B is a schematic of forces acting upon the exemplary robotic system shown in FIG. 12A.

The operation of robotic system 500 can be effectively modeled using a Newton-Euler rigid body model as described below with reference to FIG. 12B, which corresponds to the structures shown and described in FIG. 12A. The robotic system 500 is aligned with 10 propellers, each located in the original $O_{i(i=1-10)}$. For each propeller, the rotation velocity di creating forces and torques acting on the cube-drone are shown in FIG. 12B. To model the cube-drone, the following assumption is made:

The cube-drone structure is rigid and symmetrical.

The angular motion of the cube drone is low amplitude.

The propellers are supposed rigid; the thrust and drag of the propellers are proportional to the square of the propeller's speed which means:

$$F_i = k_i w_i^2$$

$$\tau_i = \begin{cases} k_d w_i^2 & \text{(if } w_i \text{ follow the clockwise)} \\ -k_d w_i^2 & \text{(if } w_i \text{ follow the anticlockwise,)} \end{cases}$$

where $k_r$, $k_d$ are constants characterized by the propeller.

The linear velocity of the cube-drone in the Earth frame is defined by: $\xi=[\dot{x}, \dot{y}, \dot{z}]^T$. The roll-pitch-yaw angle of the Cube-drone is defined by $\varphi$, $\theta$, $\psi$. The Newton-Euler equation of the cube-drone motion is given by:

$$\begin{cases} m\ddot{\xi} = F_b + F_d + F_g \\ J_M\dot{\Omega} = -\Omega \wedge J_M\Omega + \Gamma_f - \Gamma_g \end{cases}, \tag{1}$$

where m is the mass of the Cube-drone; $F_b$, $F_d$, $F_g$ are the resultant of the forces generated by the propeller rotors, the resultant of the drag forces, and the gravity forces, respectively. $J_M$ is the inertial moments matrix. $\Omega$ is the angular velocity in the cube-frame $O_B$ and is defined as:

$$\Omega = \begin{pmatrix} 1 & 0 & -\sin\theta \\ 0 & \cos\phi & \cos\theta\sin\phi \\ 0 & -\sin\phi & \cos\phi\cos\theta \end{pmatrix}\begin{bmatrix} \dot{\phi} \\ \dot{\theta} \\ \dot{\psi} \end{bmatrix}. \tag{2}$$

Assume that the angular motions of the Cube drone is low amplitude so that $\Omega$ can be assimilated to $[\dot{\varphi}, \dot{\theta}, \dot{\psi}]^T$. Assume that the cube-drone is symmetrical, then the inertial moments matrix is defined as:

$$J_M = \mathrm{diag}(I_{xx}, I_{yy}, I_{zz}). \tag{3}$$

Therefore, the element $-\Omega\wedge J_M\Omega$ can be calculated as:

$$-\Omega \wedge J_M\Omega = -\begin{bmatrix} \dot{\phi} \\ \dot{\theta} \\ \dot{\psi} \end{bmatrix} \wedge \begin{pmatrix} I_{xx} & 0 & 0 \\ 0 & I_{yy} & 0 \\ 0 & 0 & I_{zz} \end{pmatrix}\begin{bmatrix} \dot{\phi} \\ \dot{\theta} \\ \dot{\psi} \end{bmatrix} \tag{4}$$

$$= \begin{bmatrix} \dot{\theta}\dot{\psi}(I_{yy} - I_{zz}) \\ \dot{\psi}\dot{\phi}(I_{zz} - I_{xx}) \\ \dot{\phi}\dot{\theta}(I_{xx} - I_{yy}) \end{bmatrix} \tag{5}$$

The drag forces $F_d$ is defined as:

$$F_d = \begin{pmatrix} -K_{dx} & 0 & 0 \\ 0 & -K_{dy} & 0 \\ 0 & 0 & -K_{dz} \end{pmatrix}\dot{\xi}. \tag{6}$$

The gravity forces $F_g = [0\ 0\ -mg]^T$. The forces generated by the propeller rotor $F_b$ can be calculated based on the total forces applied on the cube-drone in the 0B frame by:

$$F_b = R_E\begin{bmatrix} F_x \\ F_y \\ F_z \end{bmatrix} \tag{7}$$

with $R_E$ is the homogenous matrix transformation:

$$R_E = \begin{bmatrix} c_\psi c_\theta & -s_\psi c_\phi + c_\psi s_\theta s_\phi & s_\psi s_\phi + c_\psi s_\theta c_\phi \\ s_\psi c_\theta & c_\psi c_\phi + s_\psi s_\theta s_\phi & -c_\psi s_\phi + s_\psi s_\theta c_\phi \\ -s_\theta & c_\theta s_\phi & c_\theta c_\phi \end{bmatrix} \tag{8}$$

with $c_{\phi,\theta,\psi}=\cos(\phi, \theta, \psi)$, $s_{\phi,\theta,\psi}=\sin(\phi, \theta, \psi)$ and $t_\theta=\tan\theta$. The general forces $F_x$, $F_y$, $F_z$ the body frame is identified by:

$$\begin{cases} F_x = F_9 + F_{10} \\ F_y = 0 \\ F_z = \sum_{i=1}^{8} F_i \end{cases} \tag{9}$$

Moreover, $\Gamma_f$, $\Gamma_g$ are the general moment generated by the forces $F_{i(i=1\text{-}10)}$, torques $\tau_{i(i=1\text{-}10)}$, and the resultant torques due to the gyroscopic effect, respectively.

$$\Gamma_f = \sum_{i=1}^{10}\tau_{F_i}^B + \tau_i^B = \sum_{i=1}^{10}p_{O_i}^B \wedge F_i + \sum_{i=1}^{10}{}^BR_{O_i}\tau_i = \begin{bmatrix} C_1 \\ C_2 \\ C_3 \end{bmatrix} \tag{10}$$

$$\Gamma_g = \sum_{i=1}^{8}\Omega \wedge J_r\begin{bmatrix} 0 \\ 0 \\ \omega_i \end{bmatrix} + \sum_{i=9}^{10}\Omega \wedge J_r\begin{bmatrix} \omega_i \\ 0 \\ 0 \end{bmatrix} = \begin{bmatrix} J_r\dot{\theta}\overline{\omega}_n \\ J_r(\dot{\psi}\overline{\omega}_d - \dot{\phi}\overline{\omega}_n) \\ -J_r\dot{\theta}\overline{\omega}_d \end{bmatrix} \tag{11}$$

where ${}^BR_{O_i}$ is the projection from frame $O_i$ to $O_B$, $w_{i(i=1\text{-}10)}$ is the rotor velocity of the propeller i, $p_{O_i}^B$ is the vector of the body-frame to the origin of propeller at $O_i$, $J_r$ is the rotor inertia; $\overline{\omega}_n = \Sigma^8_{i=1}\omega_i$ and $\overline{\omega}_d = \Sigma^{10}_{i=9}\omega_i$ are the total horizontal and vertical rotor velocity. Substituting equation (5), (6), (7), (10), (11) into the Newton-equation (1), the full dynamic model of the cube-drone is as follows:

$$m\ddot{x} = c_\psi c_\theta F_x + (s_\psi s_\phi + c_\psi s_\theta c_\phi)F_z - K_{dx}\dot{x} \tag{12}$$

$$m\ddot{y} = s_\psi c_\theta F_x + (s_\psi s_\theta c_\phi - c_\psi s_\phi)F_z - K_{dy}\dot{y} \tag{13}$$

$$m\ddot{z} = -s_\theta F_x + c_\theta c_\phi F_z - K_{dz}\dot{z} - mg \tag{14}$$

$$I_{xx}\ddot{\phi} = \dot{\theta}\dot{\psi}(I_{yy} - I_{zz}) - J_r\dot{\theta}\overline{\omega}_n + C_1 \tag{15}$$

$$I_{yy}\ddot{\theta} = \dot{\psi}\dot{\phi}(I_{zz} - I_{xx}) - J_r(\dot{\psi}\overline{\omega}_d - \dot{\phi}\overline{\omega}_n) + C_2 \tag{16}$$

$$I_{zz}\ddot{\psi} = \dot{\phi}\dot{\theta}(I_{xx} - I_{yy}) + J_r\dot{\theta}\overline{\omega}_d + C_3. \tag{17}$$

In view of the many possible embodiments to which the principles of the disclosure may be applied, it should be recognized that the illustrated embodiments are only examples and should not be taken as limiting the scope of the disclosure. Rather, the scope of the disclosure is defined by the entire contents of this description and the accompanying drawing figures, and additionally by the following claims, as they would be recognized and understood by a person having an ordinary level of skill in the relevant art.

We claim:

1. A robotic system for inspecting a structure, comprising:
a rigid frame, wherein the rigid frame comprises a first side, a second side, a third side, a fourth side, an upper side, and a lower side;
a propulsion system coupled to the rigid frame, the propulsion system comprising four downward facing propellers coupled to the upper side of the rigid frame and four upward facing propellers coupled to the lower side of the rigid frame;
a locomotion system coupled to the rigid frame, the locomotion system comprising a plurality of wheel systems, each wheel system comprising a support leg coupled to the rigid frame and at least one wheel coupled to the support leg;
a first plurality of actuators configured with motors to cause the support legs to move relative to the rigid frame;

a second plurality of actuators configured with motors to cause one or more wheels to rotate;

at least one buoyant member coupled to the rigid frame, the buoyant member be sufficiently buoyant to cause the robotic system to float when the buoyant member is in contact with water.

2. The robotic system of claim 1, wherein the propulsion system comprises a plurality of support arms that extend from the rigid frame, and the plurality of propellers comprise at least two propellers attached to each support arm.

3. The robotic system of claim 1, wherein the propulsion system comprises four pairs of facing propellers, each pair of facing propellers be aligned with each other along a vertical axis.

4. The robotic system of claim 2, wherein each support arm has a first end and a second end, and each first end and second end of a respective support arm has a propeller coupled thereto.

5. The robotic system of claim 4, wherein the support legs extend outward, relative to the rigid frame, from respective ones of the first end or second end of the plurality of support arms.

6. The robotic system of claim 5, wherein each support arm has a first side and a second side that is opposite the first side, wherein the propellers are coupled to the support arms on the first side and the support legs are coupled to the support arms on the second side.

7. The robotic system of claim 1, further comprising one or more batteries coupled to the frame.

8. The robotic system of claim 1, wherein the propellers comprise 4-blade propellers.

9. The robotic system of claim 1, further comprising a plurality of sensors configured to receive information about the structure and/or the robotic system.

10. The robotic system of claim 9, wherein the plurality of sensors include one or more navigation sensors.

11. The robotic system of claim 10, wherein the navigation sensors comprise at least one of IMU, GPS, or UWB sensors.

12. The robotic system of claim 9, wherein the plurality of sensors comprise one or more of a video camera, thermal camera, RGB-D camera, LiDAR, laser scanner, RADAR, ultrasonic sensor, or an infrared sensor.

13. The robotic system of claim 1, further comprising an extendable member, the extendable member being configured with one or more moving components to extend from the rigid frame from a first length to a second length, the second length being greater than the first.

14. The robotic system of claim 13, wherein the extendable member is a delta manipulator.

15. The robotic system of claim 13, wherein the extendable member comprises a zippermast mechanism.

16. The robotic system of claim 14, wherein at least one of the plurality of sensors are mounted on the extendable member.

17. The robotic system of claim 1, further comprising at least one cyclorotor mounted on the frame, the at least one cyclorotor comprising a plurality of blades.

18. The robotic system of claim 17, wherein the at least one cyclorotor comprises a pair of spaced-apart cyclorotors.

19. The robotic system of claim 18, wherein the plurality of sensors include a wind sensor that can detect information about wind magnitude and direction.

\* \* \* \* \*